United States Patent
Moriyama et al.

(10) Patent No.: US 7,644,781 B2
(45) Date of Patent: Jan. 12, 2010

(54) WALK-BEHIND WORKING MACHINE THROTTLE CONTROL

(75) Inventors: Hiroshi Moriyama, Wako (JP); Takashi Suzuki, Wako (JP); Masayuki Sasaoka, Wako (JP); Makoto Warashina, Ormes-Loire (FR); Dominique Vougier, Ormes-Loire (FR)

(73) Assignee: Honda Motor Co., Ltd. (JP)

( * ) Notice: Subject to any disclaimer, the term of this patent is extended or adjusted under 35 U.S.C. 154(b) by 293 days.

(21) Appl. No.: 11/374,843

(22) Filed: Mar. 14, 2006

(65) Prior Publication Data

US 2006/0211540 A1   Sep. 21, 2006

(30) Foreign Application Priority Data

Mar. 18, 2005   (JP) .............................. 2005-080434

(51) Int. Cl.
*A01B 3/02* (2006.01)
*A01B 3/04* (2006.01)
*A01B 5/02* (2006.01)
*A01B 15/12* (2006.01)
*A01B 39/00* (2006.01)

(52) U.S. Cl. ..................... 172/350; 192/99 R; 180/19.3

(58) Field of Classification Search ................ 56/10.8, 56/11.1–11.7, 10.5; 474/8, 23; 180/19.3, 180/278, 230; 172/350; 192/99 R, 99 S, 192/99 A, 99 B See application file for complete search history.

(56) References Cited

U.S. PATENT DOCUMENTS

| | | | | |
|---|---|---|---|---|
| 4,309,862 A | * | 1/1982 | Carlson ....................... | 56/10.5 |
| 4,335,566 A | * | 6/1982 | Hurd .......................... | 56/11.8 |
| 4,476,643 A | * | 10/1984 | Hilchey et al. ................ | 37/245 |
| 4,667,459 A | * | 5/1987 | Scanland et al. .............. | 56/11.3 |
| 4,835,949 A | * | 6/1989 | Seyerle ....................... | 56/10.8 |
| 4,856,264 A | * | 8/1989 | Nishimura et al. ............ | 56/10.9 |
| 4,930,369 A | * | 6/1990 | Barnard et al. ............... | 74/480 R |
| 4,932,192 A | * | 6/1990 | Ishimaru ...................... | 56/11.8 |
| 5,119,632 A | * | 6/1992 | Nishimura et al. ............ | 60/487 |
| 5,251,711 A | * | 10/1993 | Meyer et al. ................ | 180/19.1 |
| 5,316,097 A | * | 5/1994 | Meyer et al. ................ | 180/19.1 |
| 5,375,674 A | * | 12/1994 | Peter ......................... | 180/19.3 |
| 5,467,583 A | * | 11/1995 | Beugelsdyk et al. .......... | 56/10.8 |

(Continued)

FOREIGN PATENT DOCUMENTS

JP          02216330 A  *   8/1990

(Continued)

*Primary Examiner*—Árpád Fábián-Kovács
(74) *Attorney, Agent, or Firm*—Adams & Wilks

(57) ABSTRACT

A walk-behind working machine includes a first clutch mechanism for connecting or disconnecting drive between an engine and a working member of the working machine. The first clutch mechanism includes a first clutch lever having a first activating member. A second clutch mechanism is configured to connect or disconnect drive between the engine and traveling members of the working machine. The second clutch mechanism includes a second clutch lever having a second activating member. A throttle regulating mechanism has a pivoting member for engagement with one of the first activating member of the first clutch mechanism and the second activating member of the second clutch mechanism so as to undergo pivotal movement to shift a throttle for the engine from a first opened position in which an idling engine speed is produced to a second opened position in which a working-machine-activating engine speed is produced.

11 Claims, 11 Drawing Sheets

U.S. PATENT DOCUMENTS

| | | | |
|---|---|---|---|
| 5,542,241 A * | 8/1996 | Lydy et al. | 56/11.3 |
| 5,701,967 A * | 12/1997 | Barnard | 180/19.3 |
| 5,735,064 A * | 4/1998 | Holl | 37/260 |
| 6,047,614 A * | 4/2000 | Beugelsdyk et al. | 74/502.2 |
| 7,032,333 B2 * | 4/2006 | Friberg et al. | 37/260 |
| 2002/0153179 A1 * | 10/2002 | Kobayashi et al. | 180/19.3 |
| 2003/0006073 A1 * | 1/2003 | Iida et al. | 180/19.1 |
| 2003/0056481 A1 * | 3/2003 | Trefz | 56/11.1 |

FOREIGN PATENT DOCUMENTS

| | | |
|---|---|---|
| JP | 03025033 | 2/1991 |

* cited by examiner (COMP. EX.)

(EX.)

WALK-BEHIND WORKING MACHINE THROTTLE CONTROL

FIELD OF THE INVENTION

The present invention relates to a walk-behind working machine having a throttle adapted to be regulated in unison with a clutch operation.

BACKGROUND OF THE INVENTION

Known walk-behind working machines include handles carrying throttle levers for regulating throttles, first clutch levers for operating first clutches to connect or disconnect the drive between engines and working members, and second clutch levers for operating second clutches to connect or disconnect the drive between the engines and traveling members. These three types of the levers are individually operated.

Such working machines unavoidably make loud noise and consume more fuel than is needed, even in case the working machines stop traveling, because the engines keep running at the same speed as the engines running when the working machines perform works.

To address this problem, one may propose a walk-behind working machine, as disclosed in JP-A-3-25033, arranged so that a clutch lever can be handled to operate a throttle lever as well as to engage or disengage a clutch for connecting or disconnecting the drive between an engine and traveling units.

FIG. 11 shows a throttle lever and a clutch lever of the working machine disclosed in JP-A-3-25033. The throttle lever designated at 202 and the clutch lever designated at 203 are pivotably mounted to a handle 201. To the handle 201, there is provided a linkage 204 connected to the clutch lever 203 and the throttle lever 202 for turning the throttle lever 202 upon pivotal movement of the clutch lever 203.

The linkage 204 includes a sector gear 206 formed integrally with a shaft 205 supporting thereon the throttle lever 202, a sector gear 208 formed integrally with a shaft 207 supporting thereon the clutch lever 203, an extension spring 209 connected at one end to the sector gear 206 and at the opposite end to the sector gear 208 for urging the sector gears 206, 208 into meshing engagement with each other, and an extension spring 210 for urging the clutch lever 203 in such a direction as to disengage a clutch (not shown).

Upon releasing of the clutch lever 203 from an operator's hand (not shown), the clutch lever 203 under the force of the extension spring 210 is made pivot about the shaft 207 clockwise, as shown by an arrow R, to disengage a clutch to stop propulsion of the working machine. The sector gear 208 also pivots clockwise together with the clutch lever 203, causing the sector gear 206 to pivot about the shaft 205 counterclockwise.

Upon the counterclockwise pivotal movement of the sector gear 206, the throttle lever 202 automatically pivots forward, as shown by an arrow, to a forward inclined position providing a reduced speed of the engine whist the extension spring 209 is shifted to a lower level than the shafts 205, 207. The shifted extension spring 209 urges each of the sector gears 206, 208 in such a manner to hold the throttle lever 202 in the forward inclined position.

By virtue of the thus arranged linkage 204, the clutch lever 203 can be operated to stop the propulsion of the working machine while operating the throttle lever 202 to reduce the speed of the engine so as to prevent production of loud noise and excessive consumption of fuel.

However, the linkage 204 can apply only to the machine including one throttle lever and one clutch lever. Namely, this linkage 204 is not applicable to such a walk-behind working machine as a self-propelled lawn mower designed so that, in addition to a throttle lever, a handle carries two clutch levers, one for operating a clutch to enable or stop rotation of cutting blades and the other for operating a clutch to enable or stop propulsion of the working machine. In the case of this type of the lawn mower, whenever each of the two clutches is engaged, the throttle lever should be operated to move a throttle from an opened position providing an idling speed of an engine to a further opened position providing a speed of the engine for rotating the cutting blades or propelling the lawn mower. It is preferable to provide the lawn mower with a linkage for controlling the throttle lever upon operation of a selected one of the two clutch levers.

What is needed is a technique useful for a walk-behind working machine including the above two clutch levers, as well as for a walk-behind working machine including either one of the two clutch levers. More specifically, such a conventional linkage as disclosed in JP-A-3-25033 needs to be improved to control a throttle lever upon operation of selected one of two clutch levers.

SUMMARY OF THE INVENTION

According to a first aspect of the present invention, there is provided a walk-behind working machine comprising: a machine body; an engine carried on the machine body; a regulating mechanism for regulating a throttle for the engine; a working member; a first clutch mechanism for connecting or disconnecting drive between the engine and the working member; a handle extending rearwardly from a rear part of the machine body, the regulating mechanism including: a pivoting member pivotably attached to the handle; a throttle wire extending from the throttle and connected at a distal end thereof to the pivoting member; an engagement member provided to the pivoting member for engagement with the first clutch mechanism; the first clutch mechanism including: a first clutch for connecting or disconnecting the drive between the engine and the working member; a first clutch lever pivotably attached to the handle; a first clutch wire extending from the first clutch and connected at a distal end thereof to the first clutch lever; and a first activating member provided to the first clutch lever and engageable with the engagement member to shift the throttle from a first opened position in which an idling engine speed is produced to a second opened position in which a working-machine-activating engine speed is produced to thereby place the first clutch in a connected state.

When the first clutch lever is operated to engage the first clutch, the first activating member provided to the first clutch lever causes the throttle to move from the first opened position to the second opened position. In other words, operation of the throttle can be performed by operation of the clutch lever. With this arrangement, the working machine need not be equipped with a throttle lever separate from the clutch lever. Thus, a user can control both the throttle and the first clutch by operating the clutch lever alone.

Preferably, the walk-behind working machine further comprises traveling members and a second clutch mechanism for connecting or disconnecting drive between the engine and the traveling members, the second clutch mechanism comprising: a second clutch for connecting or disconnecting the drive between the engine and the traveling members; a second clutch lever pivotably attached to the handle; a second clutch wire extending from the second clutch and connected at a distal end thereof to the second clutch lever; and a second activating member provided to the second clutch lever and selectively engageable with the first activating member relative to the engagement member to shift the throttle from the first opened position to the second opened position to thereby place the second clutch in a connected state.

Since the second clutch lever is provided with the second activating member for engagement with the engagement member, it becomes possible for a user to select and operate one of the two clutch levers to move the throttle. Such an arrangement including the first clutch lever and the second clutch lever is applicable to various types of working machines.

Desirably, the walk-behind working machine further comprises a selection mechanism provided to the first clutch lever and engageable with the first activating member to operate jointly with the first activating member to thereby place the first clutch in a connected state.

When the first clutch is operated together with the selection mechanism, the working machine can perform a work operation. When the second clutch lever is operated without the selection mechanism being operated, the working machine can travel without performing the work operation.

According to a second aspect of the present invention, there is provided a walk-behind working machine comprising: a first clutch mechanism for connecting or disconnecting drive between an engine and a working member of the working machine; a second clutch mechanism for connecting or disconnecting drive between the engine and traveling members of the working machine; a selection mechanism capable of selecting connection of the drive between the engine and the working member or the drive between the engine and the traveling member; and a throttle regulating mechanism operable in unison with one of the first clutch mechanism and the second clutch mechanism to shift a throttle for the engine from a first opened position in which an idling engine speed is produced to a second opened position in which a working-machine-activating engine speed is produced.

BRIEF DESCRIPTION OF THE DRAWINGS

Certain preferred embodiments of the present invention will be described in detail below, by way of example only, with reference to the accompanying drawings, in which:

FIG. 8A shows a control apparatus of a walk-behind working machine in a comparative example while

DETAILED DESCRIPTION OF THE PREFERRED EMBODIMENTS

Description will be made as to a self-propelled lawn mower 10 which is an exemplary walk-behind working machine according to the present invention.

Figure 1:
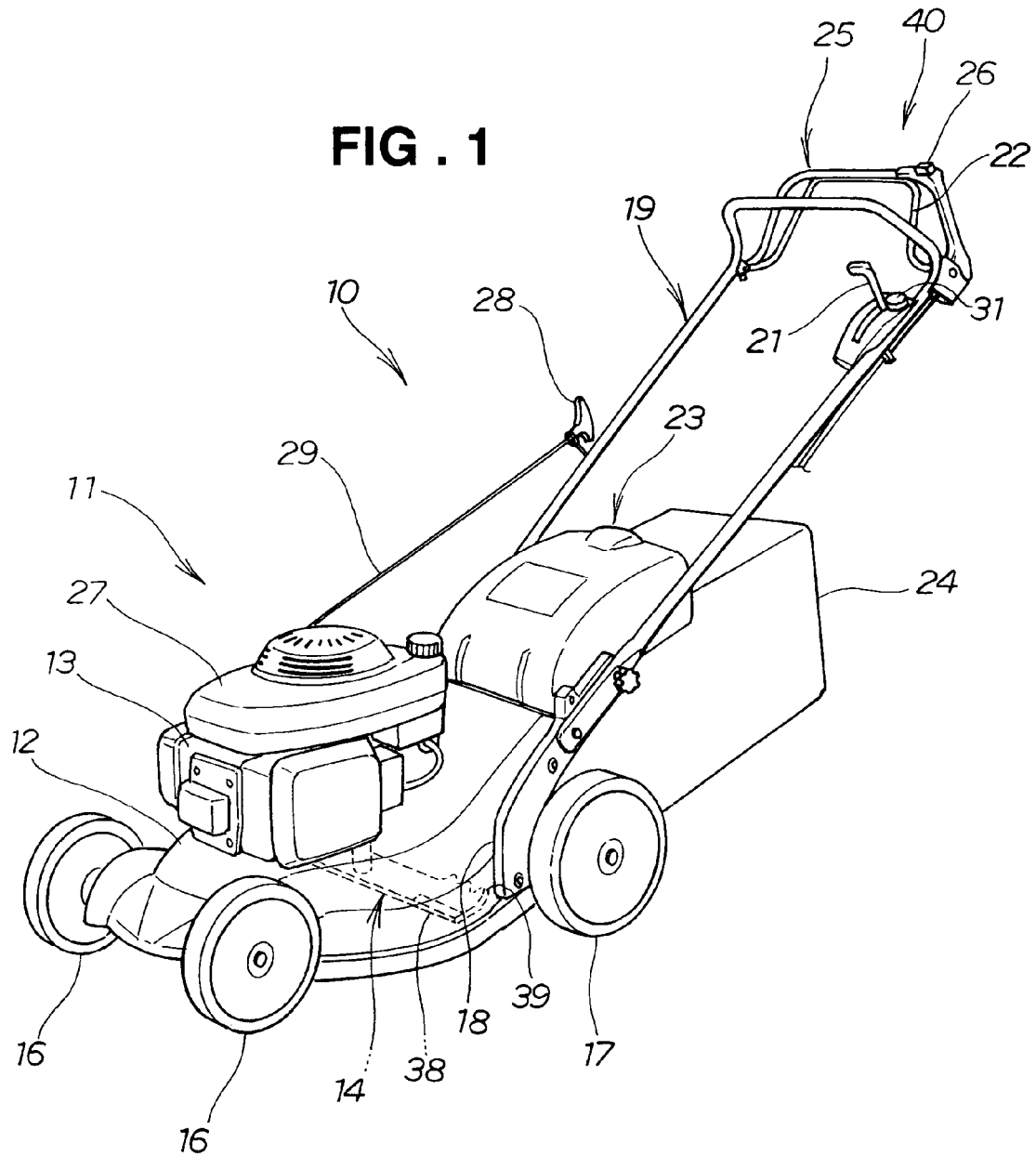
FIG. 1 is a perspective view of a lawn mower according to the present invention.
Figure 2:
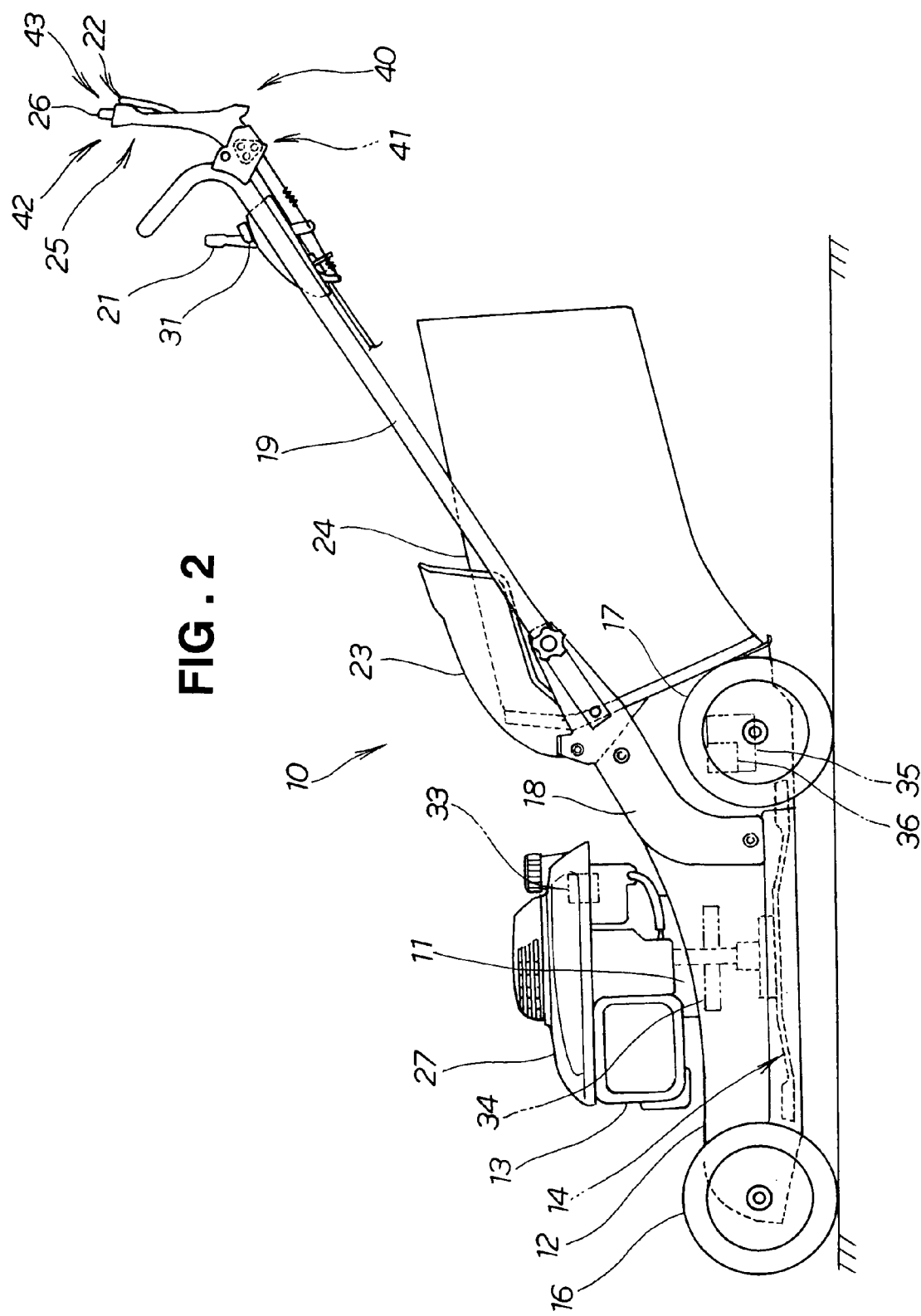
FIG. 2 is a side elevation view of the lawn mower shown in FIG. 1.
Figure 3:
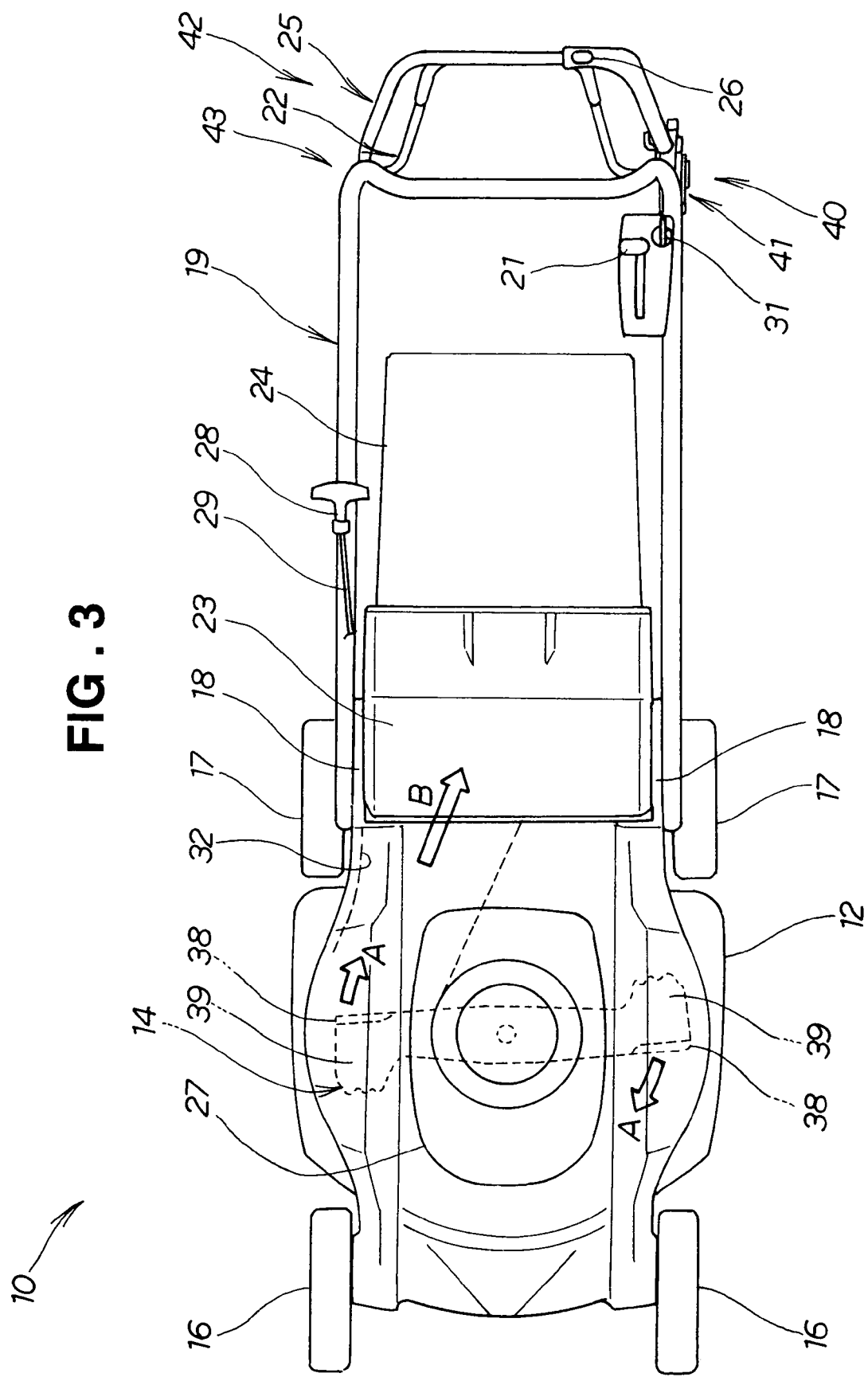
FIG. 3 is a plan view of the lawn mower shown in FIG. 1.

Referring to FIGS. 1, 2 and 3, the lawn mower 10 is arranged so that a rotary cutter blade (a working member) 14, driven by a motive power produced by an engine (motive power source) 13, cuts grass and then the cut grass is blown from a cutter housing (a cutter deck) 12 into a grass bag 24 by a conveying air. Rear wheels (traveling members) 17, 17 are driven by the motive power from the engine 13 for rotation.

Reference numerals 11, 16, 18, 19, 21, 23, 27, 28, 29, 31 represent a machine body, a front wheel, a handle stay, a handle (operating handle), a shift lever, a grass cover, a head cover, a recoil starter knob, a recoil starter rope, and a starting switch, respectively.

A first clutch lever 25 is operated when the cutter blade 14 is to be rotated or when rotation of the cutter blade 14 is to be stopped. More specifically, the first clutch lever 25 is provided for operating a blade brake clutch abbreviated as "BBC" (hereinafter referred to as "first clutch") 34 designed to brake the cutter blade 14 for stopping the rotation of the cutter blade 14. The first clutch lever 25 has a top end at which a selection knob 26 is located. The engine 13 is carried on the machine body 11. A second clutch lever 22 is operated when the motive power of the engine 13 is to be transmitted to the rear wheels 17, 17 or the transmission of the motive power of the engine 13 to the rear wheels 17, 17 is to be cut off.

As shown in FIGS. 2 and 3, the lawn mower 10 includes a regulating mechanism 41 for regulating a throttle 33, a first clutch mechanism 42 including the first clutch 34 for connecting or disconnecting the drive between the engine 13 and the cutter blade 14, and a second clutch mechanism 43 including a second clutch 36 for connecting or disconnecting the drive between the engine 13 and the rear wheels 17, 17. The regulating mechanism 41, the first clutch mechanism 42 and the second clutch mechanism 43 are provided to the handle 19 extending rearwardly from the machine body 11. The regulating mechanism 41, the first clutch mechanism 42 and the second clutch mechanism 43 interrelate to one another and jointly constitute a control apparatus 40 of the lawn mower 10.

In order that the first clutch 34 is brought from a disengaged state to an engaged state, the following two steps are performed which include: (1) depressing the selection knob 26; and then (2) turning the first clutch lever 25 towards the handle 19 with the selection knob 26 depressed.

In order for the lawn mower 10 to perform mowing operation, the first clutch 34 of the first clutch mechanism 42 is engaged to thereby drive the regulating mechanism 41 for moving the throttle 33 from a first opened position to a second opened position. In order that the lawn mower 10 travels, the second clutch 36 of the second clutch mechanism 43 is engaged to thereby drive the regulating mechanism 41 for moving the throttle 33 from the first opened position to the second opened position. In order for the lawn mower 10 to travel while performing the mowing operation, the first clutch 36 of the first clutch mechanism 42 is engaged to thereby drive the regulating mechanism 41 for moving the throttle 33 from the first opened position to the second opened position, after which the second clutch 36 of the second clutch mechanism 43 is engaged.

Definition will be made below as to each of the first opened position and the second opened position of the throttle 33.

When the throttle 33 is in the first opened position, it is meant that the throttle 33 has a degree of opening to provide an idling speed of the engine 13 for inactivating the lawn mower 10 so that the lawn mower 10 neither travels nor performs the mowing operation (i.e. the rear wheels 17, 17 are not driven and the cutter blade 14 does not rotate, either). When the throttle 33 is in the second opened position, it is meant that the throttle 33 has a degree of opening to provide a speed of the engine 13 necessary for activating the lawn mower 10 so that the lawn mower 10 both travels and performs the mowing operation, or the lawn mower 10 either travels or performs the mowing operation.

A sequence of operations for causing the lawn mower 10 to travel and perform the mowing operation is as follows.

First, the engine 13 is started. Then, the foregoing two steps (1) and (2) described above in paragraph [0036] are performed to thereby bring the first clutch 34 from the disengaged state to the engaged state for rotating the cutter blade 14 so as to cut grass. Finally, the second clutch lever 22 is turned towards the handle 19 to thereby bring the second clutch 36 from a disengaged state to an engaged state for driving the rear wheels 17, 17 to propel the lawn mower 10.

As shown in FIG. 3, the cutter blade 14 includes blade portions 38, 38 facing in a rotational direction A of the cutter blade 14, and air lift portions 39, 39 extending in an upward curve in an opposite direction from the rotational direction A.

When the cutter blade 14 rotates, negative pressure is created at bottom surfaces of the air lift portions 39. Under the action of the negative pressure, grass is forced into upright position and then cut off by the rotating cutter blade 14. The cut grass is carried by helical flow of air, produced by the rotation of the cutter blade 14, onto top surfaces of the air lift portions 39, 39, after which the cut grass is carried by conveyance air, produced by the rotation of the cutter blade 14, through a conveyance passage 32 into the grass bag 24, as shown by an arrow B.

Figure 4:
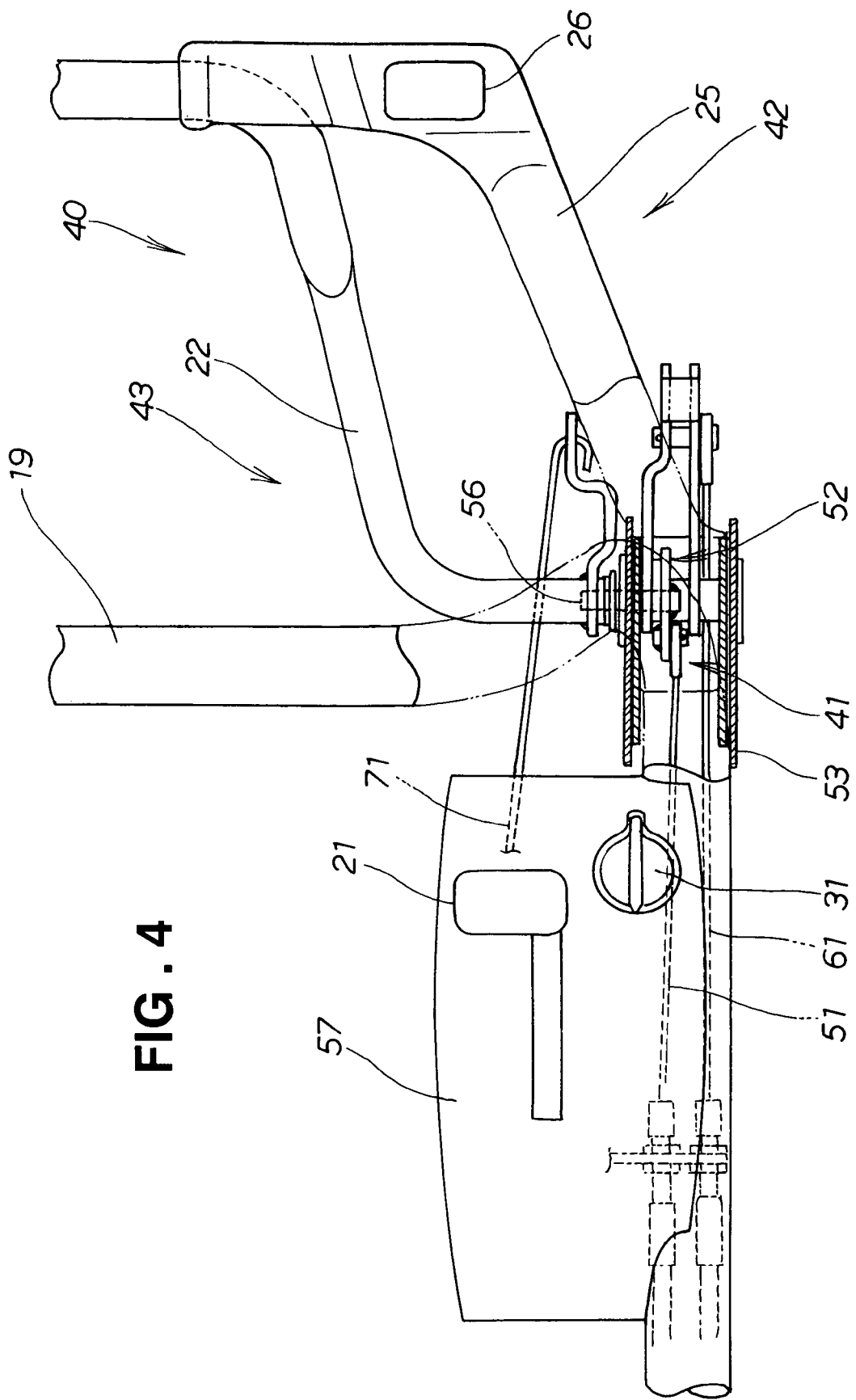
FIG. 4 is an enlarged plan view of a control apparatus shown in FIG. 3.

FIG. 4 illustrates the control apparatus 40 with the regulating mechanism 41 shown in cross section. In addition to the regulating mechanism 41, the first clutch mechanism 42 and the second clutch mechanism 43, the control apparatus 40 further includes the shift lever 21 for controlling a transmission 35. The shift lever 21 protrudes from within a control case 57. The starting switch 31 protrudes from the case 57.

Figure 5:
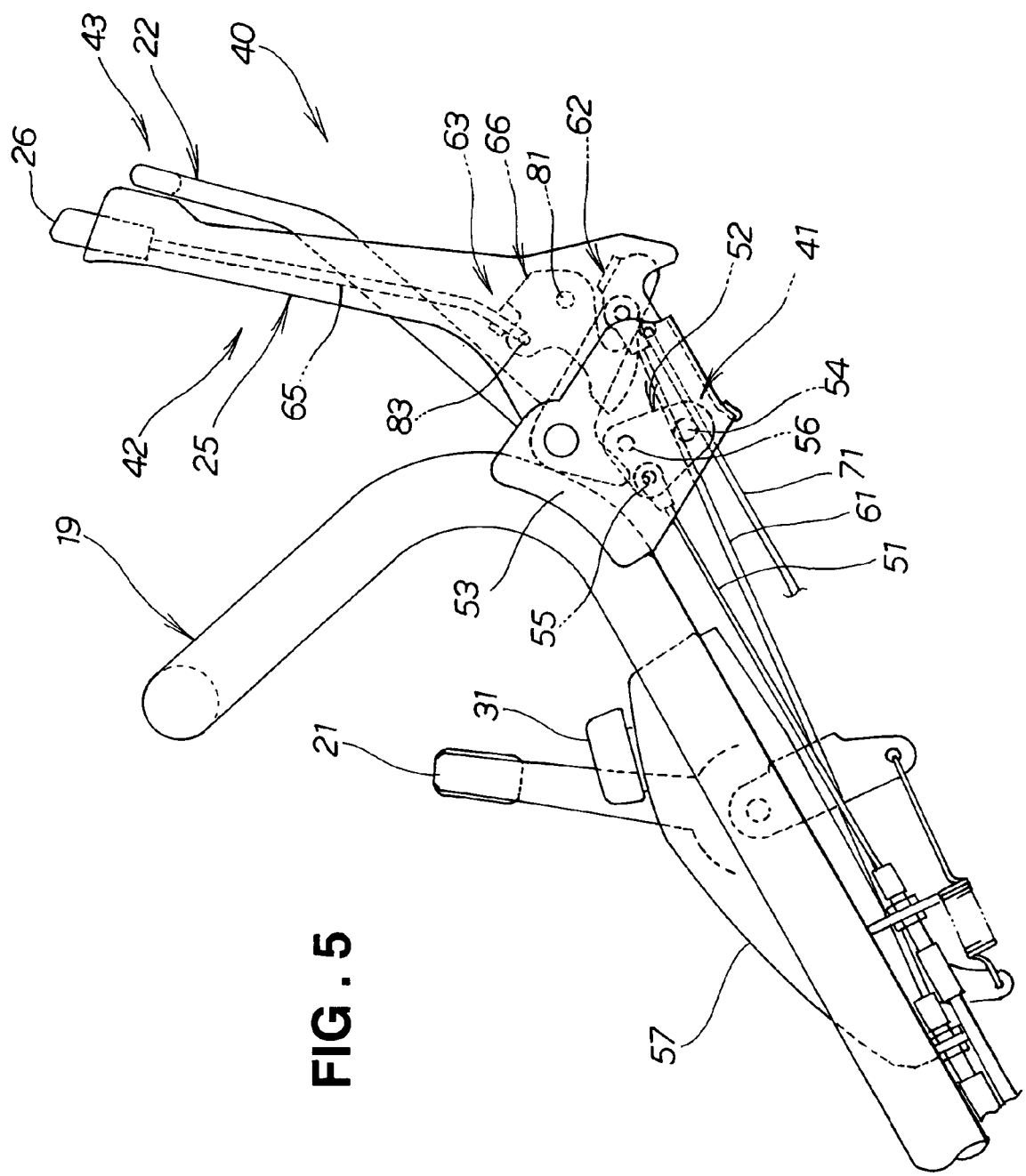
FIG. 5 is an enlarged side elevation view of the control apparatus shown in FIG. 2.
Figure 6:
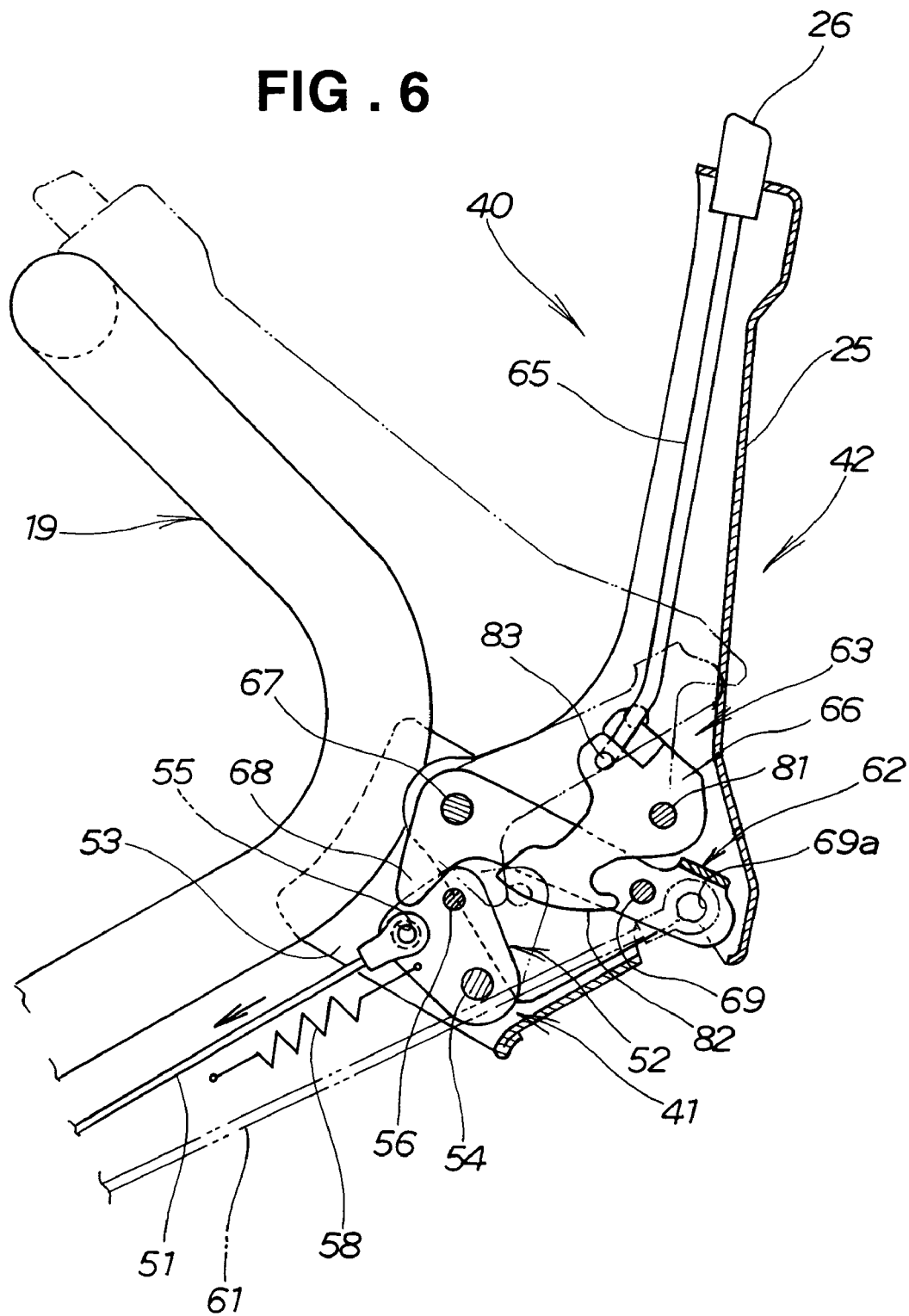
FIG. 6 is an enlarged side elevation view of a first clutch mechanism shown in FIG. 5, with part of the first clutch mechanism being shown in cross-section.

As shown in FIGS. 5 and 6, the regulating mechanism 41 includes a pivoting member 52 pivotably mounted through a support pin 54 to a handle bracket 53 carried by the handle 19, and a throttle wire 51 extending from the throttle 33 (FIG. 2) and connected at a distal end thereof to the pivoting member 52. The pivoting member 52 is pivotable on the support pin 54. The pivoting member 52 has an attachment portion 55 to which the distal end of the throttle wire 51 is attached. The regulating member 41 further includes an engagement pin (an engagement member) 56, carried by the pivoting member 52, for engagement with the first clutch mechanism 42 or the second clutch mechanism 43, as will be explained later in detail.

As shown in FIG. 6, the first clutch mechanism 42 includes the first clutch 34 for connecting or disconnecting the drive between the engine 16 and the cutter blade 14, a first clutch wire 61 extending from the first clutch 34, the first clutch lever 25 pivotably mounted through a support pin 67 to the handle bracket 53, and a first activating member 62 carried by a lower portion of the first clutch lever 25 and pivotable together with the first clutch lever 25 on the support pin 67.

The first activating member 62 includes an engaging portion 68 for engaging the engagement pin 56, and an attachment portion 69a to which a distal end of the first clutch wire 61 is attached. The first activating member 62 carries an engagement pin 69. The first activating member 62 is designed such that, when the first clutch 34 (FIG. 2) is brought to the engaged state, the engaging portion 68 of the first activating member 62 comes into engagement with the engagement pin 56 of the regulating mechanism 41 and then causes the pivoting member 52 of the regulating mechanism 41 to pivot on the support pin 54 for moving the throttle 33 (FIG. 2) from the first opened position to the second opened position.

The lawn mower 10 further includes a selection mechanism 63 including the selection knob (selection member) 26 located at the top end of the first clutch lever 25, an engaging member 66 engageable with the engagement pin 69 carried by the first activating member 62, and a rod 65 connected at a proximal end thereof to the selection knob 26 and at a distal end thereof to the engaging member 66.

The engaging member 66 is attached through a support pin 81 to the first clutch lever 25 and is pivotable together with the first clutch lever 25. The engaging member 66 has a hook-shaped portion 82 designed for hooking engagement with the engagement pin 69 carried by the first activating member 62. The engaging member 66 also has an attachment portion 83 to which the distal end of the rod 65 is attached.

Figure 7:
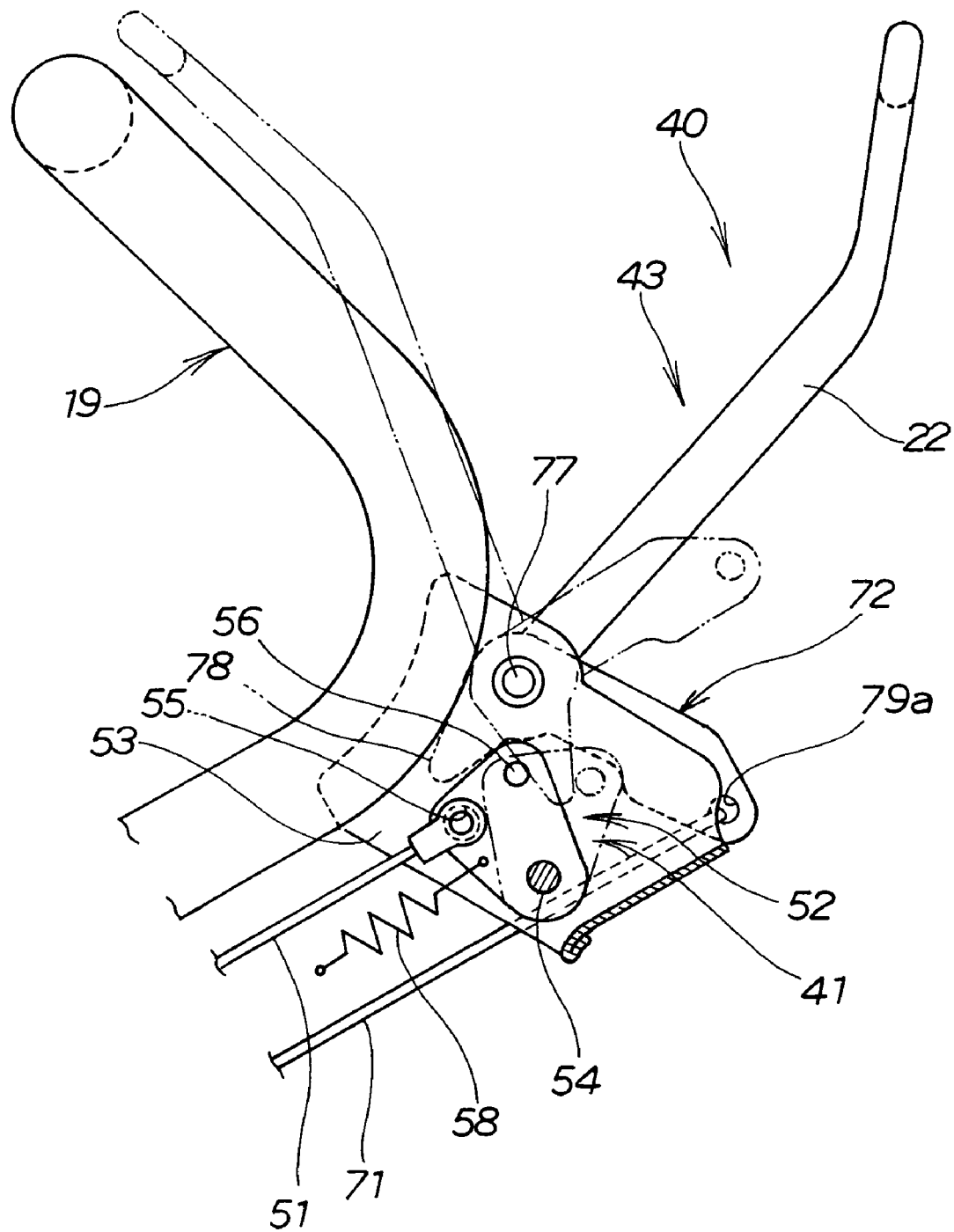
FIG. 7 is an enlarged side elevation view of a second clutch mechanism shown in FIG. 5.

Turning to FIG. 7, the second clutch mechanism 43 includes the second clutch 36 (FIG. 2) for enabling or interrupting transmission of the motive power from the engine 13 to the rear wheels 17, 17, the second clutch lever 22 pivotably attached to the handle bracket 53 through a support pin 77, a second activating member 72 carried by a lower portion of the second clutch lever 22 and pivotable on the support pin 77 together with the second clutch lever 22, and a second clutch wire 71 extending from the second clutch 22 and connected at a distal end thereof to the second activating member 72.

The second activating member 72 has an engaging portion 78 engageable with the engagement pin 56 of the regulating mechanism 41, and an attachment portion 79a to which the distal end of the second clutch wire 71 is attached. The second activating member 72 is designed such that, when the second clutch 36 is brought to the engaged state, the engaging portion 78 of the second activating member 72 comes into engagement with the engagement pin 56 of the regulating mechanism 41 and then causes the pivoting member 52 of the regulating mechanism 41 to pivot on the support pin 54 for moving the throttle 33 from the first opened position to the second opened position.

As shown in FIG. 6 or FIG. 7, the pivoting member 52 of the regulating mechanism 41 carries a resilient spring (an extension spring) 58. The spring 58 urges the pivoting member 52 to a normal position where the throttle 33 (FIG. 2) is maintained in the first opened position.

In a case where a human operator grips together the first clutch lever 25 and the handle 19 with the engaging portion 68 of the first activating member 62 engaging the engagement pin 56 of the regulating mechanism 41, if he releases his hand from the first clutch lever 25 and the handle 19, a force of the spring 58 makes the pivoting member 52 pivot back to the normal position to thereby turn the first activating member 62 and the first clutch lever 25 away from the handle 19. In short, the first clutch lever 25 is urged by the spring 58 in a direction away from the handle 19 when the first clutch lever 25 and the handle 19 are gripped together with the engaging portion 68 engaging the engagement pin 56.

Similarly, in a case where a human operator grips together the second clutch lever 22 and the handle 19 with the engaging portion 78 of the second activating member 72 engaging the engagement pin 56, if he releases his hand from the second clutch lever 22 and the handle 19, the force of the spring 58 makes the pivoting member 52 pivot back to the normal position to thereby turn the second clutch lever 22 and the second activating member 72 away from the handle 19. In short, the second clutch lever 22 is urged by the spring 58 in the direction away from the handle 19 when the second clutch lever 22 and the handle 19 are held together with the engaging portion 78 engaging the engagement pin 56.

Figure 8A:
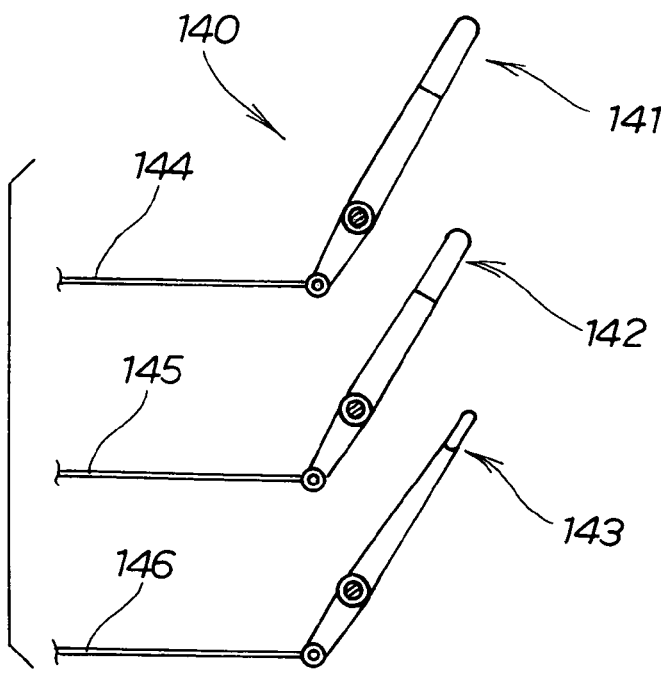
Figure 8B:
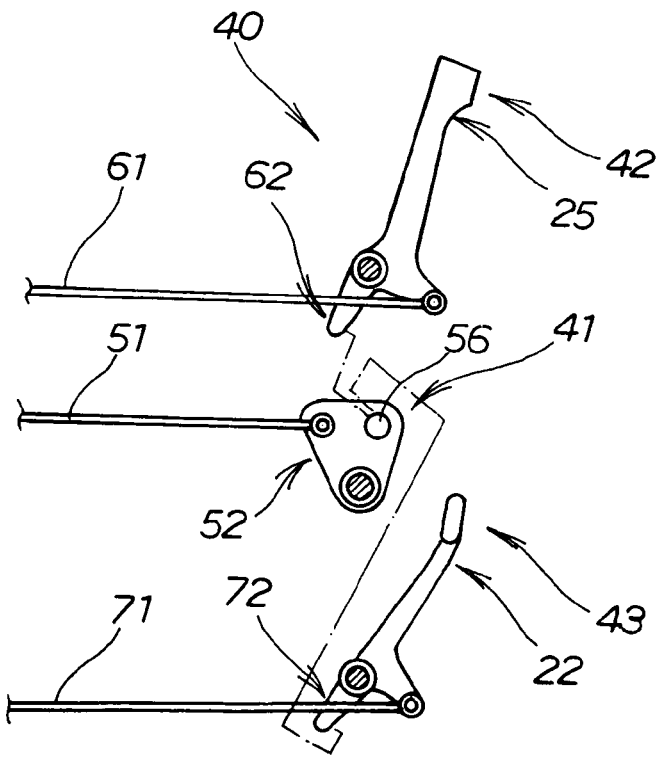
FIG. 8B shows the control apparatus of the lawn mower according to the present invention.

FIG. 8A illustrates a control apparatus 140 of a walk-behind working machine in a comparative example. FIG. 8B illustrates the control apparatus 40 of the lawn mower 10.

Turning to FIG. 8A, the control apparatus 140 includes a throttle lever 141 connected through a throttle wire 144 to a throttle for regulating the throttle, a clutch lever 142 connected through a wire 145 to a clutch for enabling or interrupting transmission of motive power from an engine to a working member such as a cutter blade, and a clutch lever 143 connected through a wire 146 to a clutch for connecting or disconnecting the drive between the engine and traveling members such as wheels. The throttle lever 141, the clutch lever 142 and the clutch lever 143 are independently operated.

The control apparatus 140 shown in FIG. 8A has a problem that, in order for the working machine to travel or perform a work operation, the throttle lever 141 should be operated, separately from the clutch lever 142 or 143, to move the throttle from a first opened position providing an idling speed of an engine to a second opened position providing a speed of the engine necessary for the working machine to perform the work or travel. It is difficult or troublesome for a user to operate the throttle lever and the clutch lever separately.

In the case of the control apparatus 40 shown in FIG. 8B, the first clutch lever 25 carries the first activating member 62 designed to engage the engagement pin 56 carried by the pivoting member 52 of the regulating mechanism 41 and then cause the pivoting member 52 to pivot in such a direction as to pull the throttle wire 51 for moving the throttle 33 (FIG. 2) from the first opened position to the second opened position. That is, since the first clutch lever 25 carries the first activating member 62 engageable with the engagement pin 56 carried by the pivoting member 52 connected to the throttle wire 51, the throttle 33 (FIG. 2) can be controlled by operation of the first clutch lever 25. It thus becomes possible to eliminate a need to provide the control apparatus 40 with a throttle lever, as found in the control apparatus 140, separately from the other clutch levers. The lawn mower 10 including the control apparatus 40 thus arranged is easier to handle.

Similarly, the second clutch lever 22 carries the second activating member 72 designed to engage the engagement pin 56 and then cause the pivoting member 52 to pivot in such a direction as to pull the throttle wire 51 for moving the throttle 33 from the first opened position to the second opened position.

The engagement of the first activating member 62 with the engagement pin 56 and the engagement of the second activating member 72 with the engagement pin 56 are selectively made. Which of the first activating member 62 and the second activating member 72 engages the engagement pin 56 carried by the pivoting member 52 is determined by whether the selection knob 26 of the selection mechanism 63 (FIG. 6) is depressed, as will be discussed later with reference to FIG. 9A through FIG. 10B.

Figure 9A:
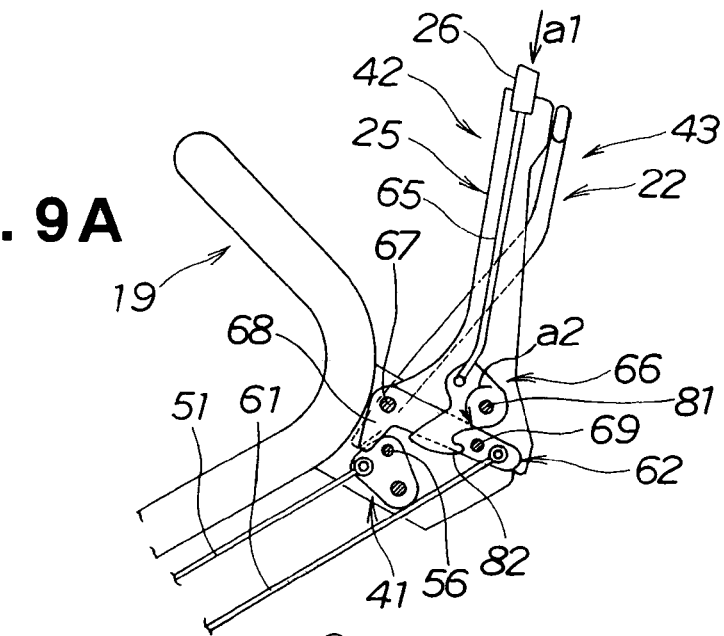
FIG. 9 through FIG. 9C show a sequence of operations for the lawn mower to perform a mowing operation while traveling.
Figure 9B:
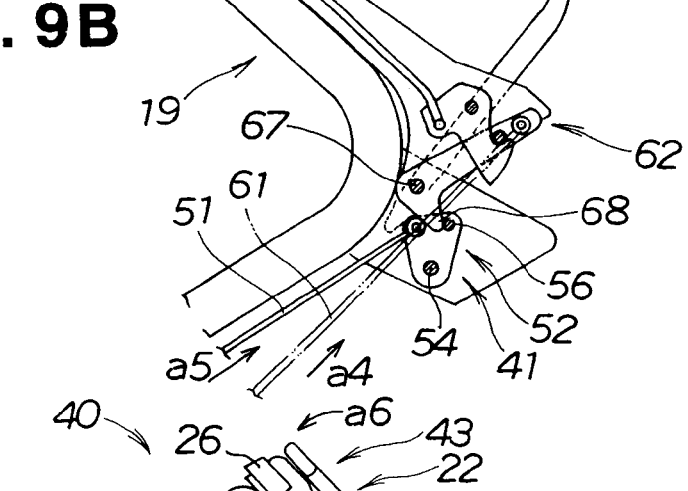
Figure 9C:
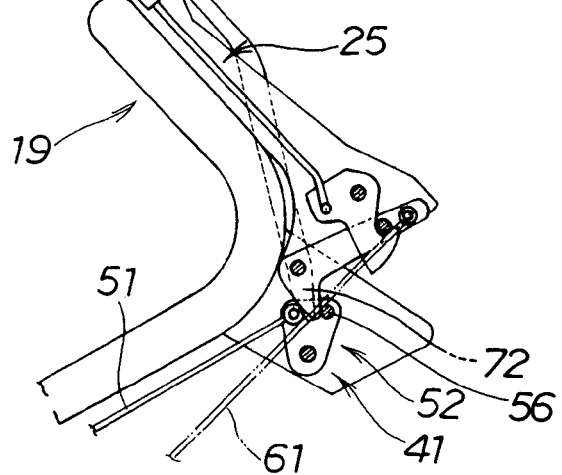

FIG. 9A through FIG. 9C show a sequence of operations for the lawn mower 10 to perform the mowing operation while traveling.

Referring to FIG. 9A, the selection knob 26 of the selection mechanism 63 is not depressed. The first clutch lever 25 is not operated. The second clutch lever 22 is not operated. The regulating mechanism 41 is not operated, either. The throttle 33 is in the first opened position providing the idling speed of the engine 13.

First, the selection knob 26 is depressed as indicated by an arrow a1. With the selection knob 26 depressed, the first clutch lever 25 is then operated or starts to pivot towards the handle 19, upon which the engaging member 66 of the selection mechanism 63 is turned, as shown by an arrow a2, to bring the hook-shaped portion 82 of the engaging member 66 into hooking engagement with the engagement pin 69 carried by the first activating member 62, such that the first clutch lever 25 is operatively connected to the first clutch wire 61.

Turning to FIG. 9B, as the first clutch lever 25 pivots to the handle 19, as shown by an arrow a3, with the hook-shaped portion 82 engaging the engagement pin 69, the first activating member 62 is caused to pivot on the support pin 67 for pulling the first clutch wire 61 as indicated by an arrow a4, to engage the first clutch 34 (FIG. 2). During the pivotal movement of the first activating member 62, the engaging portion 68 of the first activating member 62 comes into engagement with the engagement pin 56 carried by the pivoting member 52 of the regulating mechanism 41 and then causes the pivoting member 52 to pivot in such a direction as to pull the throttle wire 51, as shown by an arrow a5, for moving the throttle 33 (FIG. 2) from the first opened position to the second opened position.

In short, the pivotal movement of the first clutch lever 25 towards the handle 19, with the selection knob 26 depressed, pulls not only the first clutch wire 61 to engage the first clutch 34 (FIG. 2) but also the throttle wire 51 to move the throttle 33 from the first opened position to the second opened position.

Turning to FIG. 9C, when the second clutch lever 22 is turned to the handle 19, as shown by an arrow a6, the second activating member 72 is caused to pivot to thereby pull the second clutch wire 71 (FIG. 7). During pivotal movement of the second activating member 72, the engaging portion 78 of the second activating member 72 angularly moves towards the engagement pin 56 carried by the pivoting member 52 which has been already pivoted as discussed in relation to FIG. 9B.

With the first clutch lever 25 and the second clutch lever 22 held to the handle 19, the selection knob 26 depressed, and the throttle 33 held in the second opened position, the lawn mower 10 can perform the mowing operation while traveling.

Figure 10A:
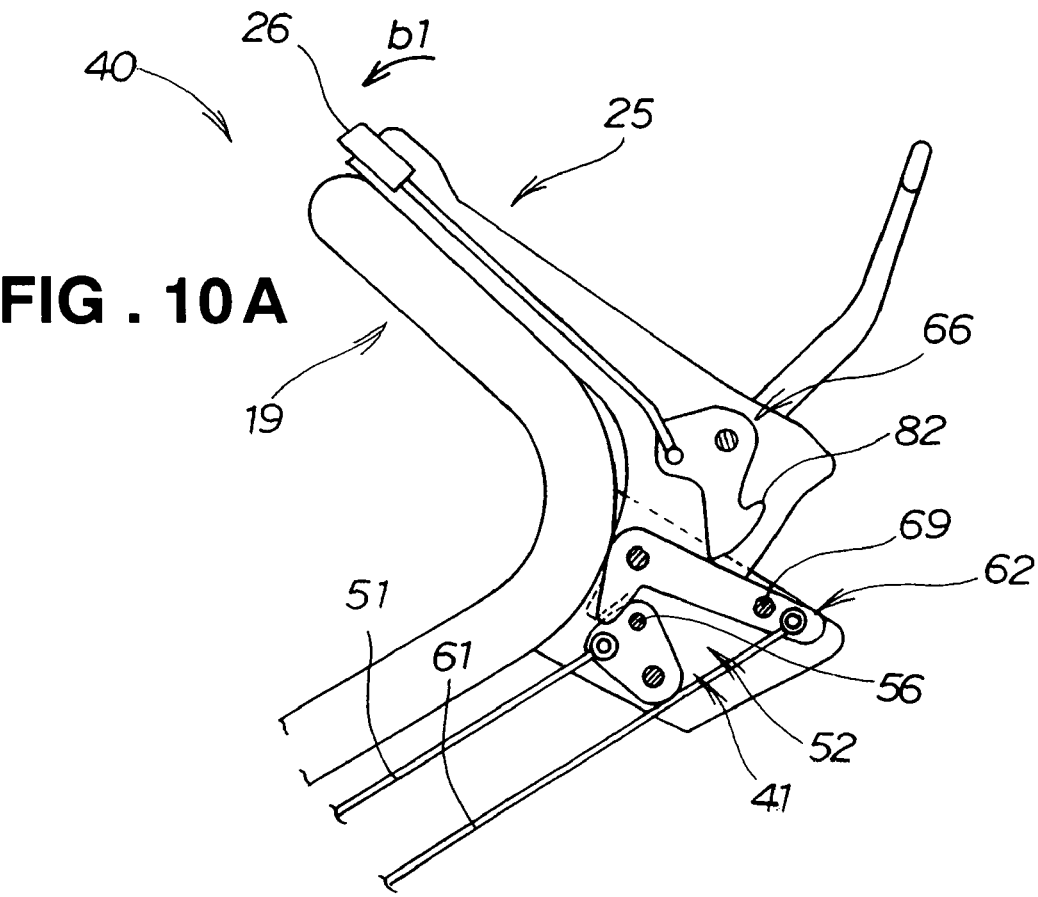
FIGS. 10A and 10B show a sequence of operations for the lawn mower to travel without performing the mowing operation.
Figure 10B:
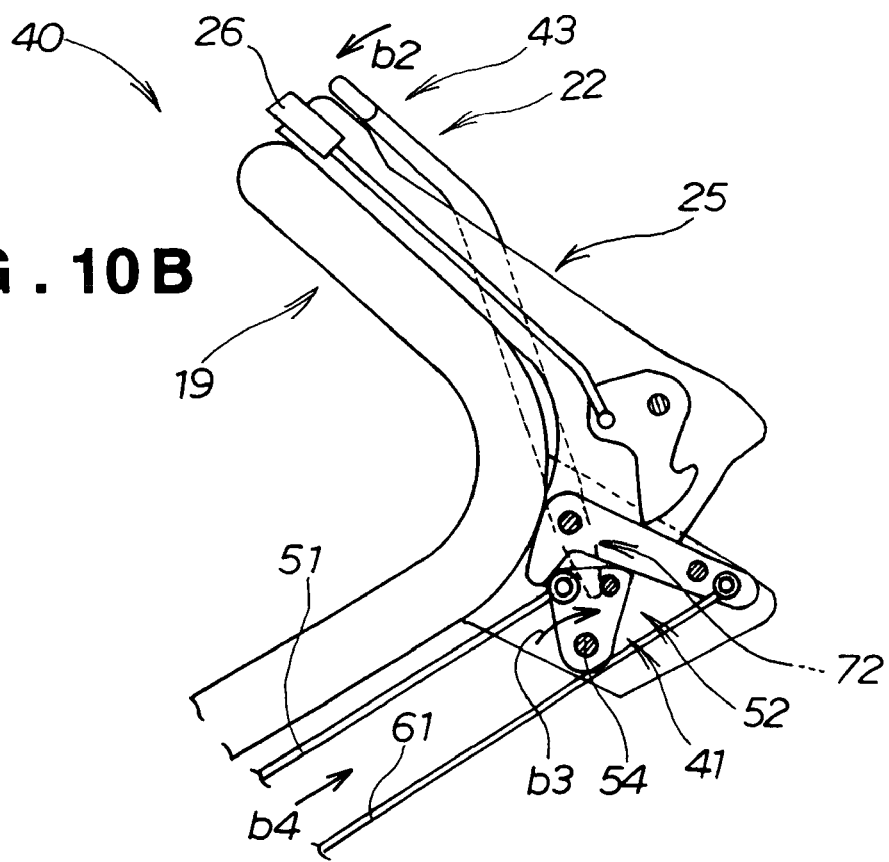
Figure 11:
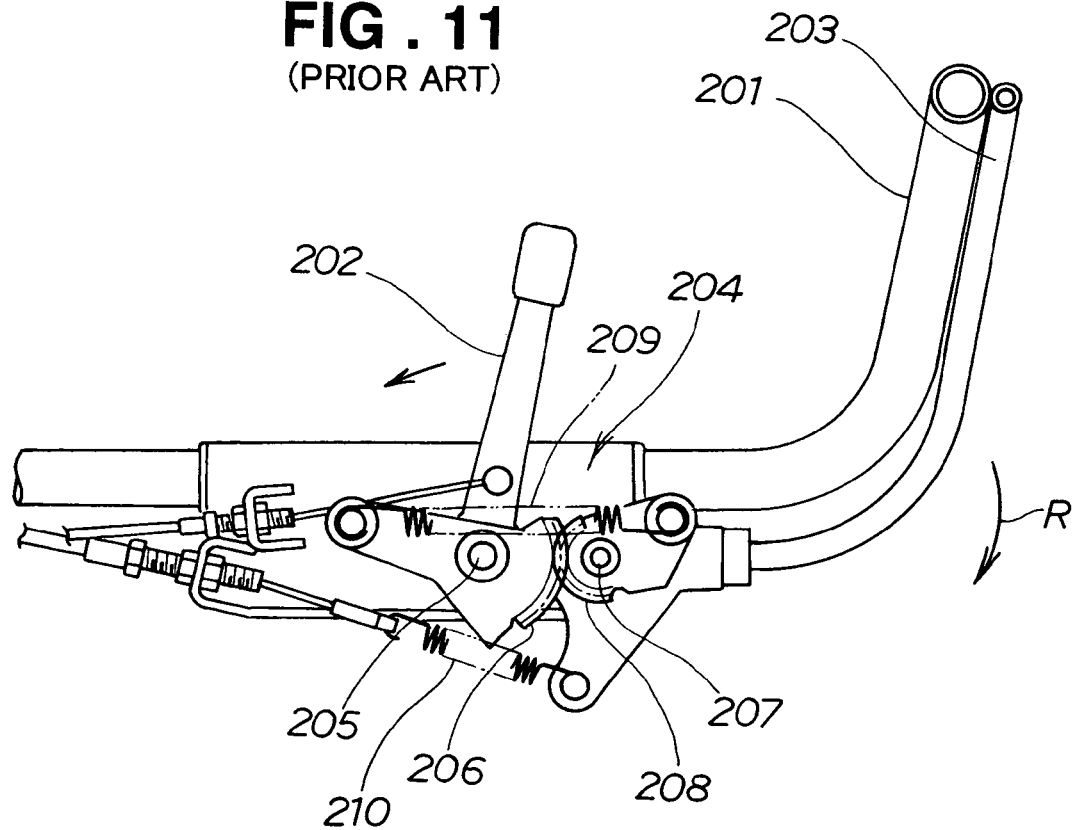
FIG. 11 shows a mechanism for a conventional lawn mower arranged such that a throttle lever is operable together with a clutch lever.

FIGS. 10A and 10B show a sequence of operations for the lawn mower 10 to travel without performing the mowing operation.

Referring to FIG. 10A, the first clutch lever 25 is turned towards the handle, as shown by an arrow b1, without the selection knob 26 being depressed. Because the selection knob 26 is not depressed, the hook-shaped portion 82 of the engaging member 66 does not engage the engagement pin 69 carried by the first activating member 62. Thus, the first clutch wire 61 is not pulled although the first clutch lever 25 is turned towards the handle 19 as shown by the arrow b1. At this time, the first clutch 34 (FIG. 2) is not engaged and the throttle 33 remains in the first opened position providing the idling speed of the engine.

Since the hook-shaped portion 82 does not engage the engagement pin 69, the first activating member 62 does not pivot. Thus, the engaging portion 68 of the first activating member 62 does not engage the engagement pin 56 carried by the pivoting member 52, either. In short, unless the selection knob 26 is depressed, the engaging portion 66 of the first activating member 62 does not engage the engagement pin 56.

Turning to FIG. 10B, when the second clutch lever 22 is turned towards the handle 19, as shown by an arrow b2, to engage the second clutch 36 (FIG. 2), the second activating member 72 is caused to pivot in such a direction as to bring the engaging portion 78 (not designated in FIG. 10B but in FIG. 7) of the second activating member 72 into engagement with the engagement pin 56 carried by the pivoting member 52 and then cause the pivoting member 52 to pivot on the support pin 54, as shown by an arrow b3. The pivotal movement of the pivoting member 52 pulls the throttle wire 51, as shown by an arrow b4, to move the throttle 33 (FIG. 2) from the first opened position to the second opened position.

With the first clutch lever 25 and the second clutch lever 22 held to the handle 19, the selection knob 26 not depressed, and the throttle 33 held in the second opened position, the lawn mower 10 can travel without performing the mowing operation.

Although, in the illustrated embodiment, the pivoting member 52 carries the engagement pin 56 which selectively engages the engaging portion 68 of the first activating member 62 and the engaging portion 78 of the second activating member 72, it may be altered so that the first and second activating members 62, 72 may carry first and second engagement pins, respectively.

Obviously, various minor changes and modifications of the present invention are possible in the light of the above teaching. It is therefore to be understood that within the scope of the appended claims the invention may be practiced otherwise than as specifically described.

What is claimed is:

1. A walk-behind working machine comprising:
   a machine body;
   a handle extending rearwardly from a rear part of the machine body;
   a working member mounted on the machine body;
   an engine supported on the machine body;
   a regulating mechanism for regulating a throttle for the engine, the regulating mechanism having a pivoting member pivotably attached to the handle and provided with an engagement pin, a throttle wire extending from the throttle and connected at a distal end thereof to the pivoting member, and an engagement member provided to the pivoting member;
   a first clutch mechanism having a first clutch for connecting or disconnecting drive between the engine and the working member, a first clutch lever pivotably attached to the handle, a first clutch wire extending from the first clutch and connected at a distal end thereof to the first clutch lever, and a first activating member provided to the first clutch lever and configured for engagement with the engagement member of the regulating mechanism to shift the throttle from a first opened position in which an idling engine speed is produced to a second opened position in which a working-machine-activating engine speed is produced to thereby place the first clutch in a connected state; and
   a selection mechanism operable to selectively engage the first clutch lever with the engagement pin of the pivoting member to thereby connect the drive between the engine and the working member.

2. A walk-behind working machine according to claim 1; wherein the selection mechanism comprises a selection member disposed at an upper end of the first clutch lever, an engaging member engageable with an engagement pin of the first activating member, and a rod connected at a proximal end thereof to the selection member and at a distal end thereof to the engaging member.

3. A walk-behind working machine according to claim 2; wherein the first clutch lever is mounted for undergoing pivotal movement; and wherein the engaging member of the selection mechanism is connected to the first clutch lever for undergoing pivotal movement therewith.

4. A walk-behind working machine according to claim 2; wherein the engaging member of the selection mechanism has a hook-shaped portion for hooking engagement with the engagement pin of the first activating member.

5. A walk-behind working machine comprising:
   a machine body;
   a handle extending rearwardly from a rear part of the machine body;
   a working member mounted on the machine body;
   traveling members mounted on the machine body for allowing the walk-behind working machine to travel along a ground surface;
   an engine supported on the machine body;
   a regulating mechanism for regulating a throttle for the engine, the regulating mechanism having a pivoting member pivotably attached to the handle, a throttle wire extending from the throttle and connected at a distal end thereof to the pivoting member, and an engagement member provided to the pivoting member;
   a first clutch mechanism having a first clutch for connecting or disconnecting drive between the engine and the working member, a first clutch lever pivotably attached to the handle, a first clutch wire extending from the first clutch and connected at a distal end thereof to the first clutch lever, and a first activating member provided to the first clutch lever and configured for engagement with the engagement member of the regulating mechanism to shift the throttle from a first opened position in which an idling engine speed is produced to a second opened position in which a working-machine-activating engine speed is produced to thereby place the first clutch in a connected state; and
   a second clutch mechanism for connecting or disconnecting drive between the engine and the traveling members, the second clutch mechanism comprising a second clutch for connecting or disconnecting the drive between the engine and the traveling members, a second clutch lever pivotably attached to the handle, a second clutch wire extending from the second clutch and connected at a distal end thereof to the second clutch lever, and a second activating member provided to the second clutch lever and selectively engageable with the first activating member of the first clutch member relative to the engagement member of the regulating mechanism to shift the throttle from the first opened position to the second opened position to thereby place the second clutch in a connected state.

6. A walk-behind working machine according to claim 5; further comprising a selection mechanism provided to the first clutch lever of the first clutch mechanism and engageable with the first activating member of the first clutch mechanism to place the first clutch in the connected state.

7. A walk-behind working machine comprising:
   a machine body;
   a working member mounted on the machine body;

traveling members mounted on the machine body for allowing the walk-behind working machine to travel along the ground surface;

an operating handle extending from the machine body for gripping by an operator to maneuver the walk-behind working machine along a ground surface;

first and second clutch levers each mounted on the operating handle for undergoing pivotal movement;

an engine mounted on the machine body and including a throttle having a degree of opening controllable by selective pivotal movement of each of the first clutch lever and the second clutch lever;

a first clutch operable by the first clutch lever to connect or disconnect drive between the engine and the working member;

a pivoting member connected to the throttle of the engine and mounted on the operating handle for selective engagement with the first clutch lever so that when the first clutch lever is operated to place the first clutch in a connected state to connect the drive between the engine and the working member, the pivoting member is pivoted to shift the throttle of the engine from a first opened position in which an idling engine speed is produced to a second opened position in which a working-machine-activating engine speed is produced; and a second clutch operable by the second clutch lever to connect or disconnect drive between the engine and the travelling members, the pivoting member being configured for selective engagement with the second clutch lever so that when the second clutch lever is operated to place the second clutch in a connected state to connect the drive between the engine and the traveling members, the pivotal member is pivoted to shift the throttle of the engine from the first opened position to the second opened position.

8. A walk-behind working machine according to claim 7; further comprising a selection mechanism operable to selectively engage either the first clutch lever with the pivoting member to thereby connect the drive between the engine and the working member or the second clutch lever with the pivoting member to thereby connect the drive between the engine and the traveling members.

9. A walk-behind working machine according to claim 8; wherein the pivoting member has an engagement pin for direct engagement with either the first clutch lever or the second clutch lever in accordance with a selection by the selection mechanism.

10. A walk-behind working machine according to claim 8; wherein the selection mechanism comprises a selection member disposed at an upper end of the first clutch lever, an engaging member engageable with an engagement pin of the first activating member, and a rod connected at a proximal end thereof to the selection member and at a distal end thereof to the engaging member.

11. A walk-behind working machine according to claim 10; wherein the first clutch lever is mounted for undergoing pivotal movement; and wherein the engaging member of the selection mechanism is connected to the first clutch lever for undergoing pivotal movement therewith.

* * * * *